(12) United States Patent
Jankolovits et al.

(10) Patent No.: US 9,957,403 B2
(45) Date of Patent: May 1, 2018

(54) AQUEOUS DISPERSION OF HYDROPHOBICALLY MODIFIED PIGMENT PARTICLES

(71) Applicants: DOW GLOBAL TECHNOLOGIES LLC, Midland, MI (US); THE REGENTS OF THE UNIVERSITY OF CALIFORNIA, Oakland, CA (US); Rohm and Haas Company, Philadelphia, PA (US)

(72) Inventors: Joseph Jankolovits, Berkeley, CA (US); Alexander Katz, Richmond, CA (US); James C. Bohling, Collegeville, PA (US); Clayton J. Radke, El Cerrito, CA (US); Antony K. Van Dyk, Collegeville, PA (US); John A. Roper, III, Midland, MI (US)

(73) Assignees: The Regents of the University of California, Oakland, CA (US); Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days. days.

(21) Appl. No.: 15/216,413

(22) Filed: Jul. 21, 2016

(65) Prior Publication Data

US 2017/0022384 A1 Jan. 26, 2017

Related U.S. Application Data

(60) Provisional application No. 62/195,977, filed on Jul. 23, 2015.

(51) Int. Cl.
| | | |
|---|---|---|
| *C09D 17/00* | (2006.01) | |
| *C09C 1/36* | (2006.01) | |
| *C09C 1/40* | (2006.01) | |
| *C09C 3/12* | (2006.01) | |
| *C09C 1/02* | (2006.01) | |
| *C09C 1/04* | (2006.01) | |
| *C09C 1/24* | (2006.01) | |
| *C09C 1/30* | (2006.01) | |
| *C09D 101/28* | (2006.01) | |
| *C09D 133/02* | (2006.01) | |

(52) U.S. Cl.
CPC .............. *C09D 17/003* (2013.01); *C09C 1/02* (2013.01); *C09C 1/028* (2013.01); *C09C 1/043* (2013.01); *C09C 1/24* (2013.01); *C09C 1/3081* (2013.01); *C09C 1/3684* (2013.01); *C09C 1/407* (2013.01); *C09C 3/12* (2013.01); *C09D 17/001* (2013.01); *C09D 101/286* (2013.01); *C09D 133/02* (2013.01); *C01P 2004/61* (2013.01); *C01P 2004/62* (2013.01); *C01P 2006/22* (2013.01)

(58) Field of Classification Search
CPC ........................ C09D 17/003; C09C 1/3684
See application file for complete search history.

(56) References Cited

U.S. PATENT DOCUMENTS

| | | | |
|---|---|---|---|
| 4,061,503 A | 12/1977 | Berger et al. | |
| 4,151,154 A | 4/1979 | Berger | |
| 5,607,994 A | 3/1997 | Tooley et al. | |
| 6,214,106 B1 | 4/2001 | Weber et al. | |
| 6,380,266 B1* | 4/2002 | Katz | B01J 13/00 427/219 |
| 6,733,884 B2 | 5/2004 | Brown | |
| 7,056,449 B2 | 6/2006 | Hoefler | |
| 7,579,081 B2 | 8/2009 | Brown | |
| 7,601,212 B2 | 10/2009 | Sabesan et al. | |
| 8,697,204 B2 | 4/2014 | Furholz et al. | |
| 9,139,737 B1* | 9/2015 | Shah | C09C 3/12 |
| 2002/0177646 A1* | 11/2002 | Field | C09D 5/084 524/430 |
| 2003/0226443 A1* | 12/2003 | Rajagopalan | B01D 53/02 95/133 |
| 2004/0034123 A1 | 2/2004 | Hoefler | |
| 2004/0121156 A1 | 6/2004 | Meyer et al. | |
| 2005/0026089 A1* | 2/2005 | Ogawa | B82Y 30/00 430/405 |
| 2005/0154086 A1* | 7/2005 | Yoneyama | C08K 9/06 523/213 |
| 2006/0204528 A1* | 9/2006 | Nolte | B82Y 30/00 424/401 |
| 2006/0246027 A1* | 11/2006 | Tanner | A61K 8/0212 424/70.12 |
| 2006/0264133 A1* | 11/2006 | Krajewski | C09D 183/04 442/104 |
| 2008/0152914 A1* | 6/2008 | Kostelnik | C01G 23/047 428/407 |
| 2009/0046053 A1* | 2/2009 | Shigehiro | G09G 3/344 345/107 |
| 2009/0064894 A1* | 3/2009 | Baumgart | C09D 1/00 106/18.32 |
| 2010/0108227 A1 | 5/2010 | Kotanides, Jr. | |
| 2011/0129509 A1* | 6/2011 | Yoshida | A61K 8/062 424/401 |
| 2011/0223424 A1 | 9/2011 | Chen et al. | |
| 2012/0316266 A1 | 12/2012 | Koyama et al. | |
| 2013/0222886 A1* | 8/2013 | Kawahara | G02F 1/167 359/296 |
| 2014/0199251 A1 | 7/2014 | Ashida et al. | |
| 2014/0335136 A1* | 11/2014 | Brieva | A61K 8/585 424/401 |
| 2015/0320656 A1* | 11/2015 | Khenniche | A61K 8/25 424/401 |
| 2016/0030304 A1* | 2/2016 | Nagamatsu | A61K 8/25 424/401 |

FOREIGN PATENT DOCUMENTS

| | | |
|---|---|---|
| JP | 2001-181559 A | 7/2001 |
| WO | 2007148683 A1 | 12/2007 |
| WO | 2011119265 A1 | 9/2011 |

OTHER PUBLICATIONS

Farrokhpay et al. (Powder Technology 202, 2010, 143-150).*
* cited by examiner

*Primary Examiner* — Liam J Heincer
(74) *Attorney, Agent, or Firm* — Riverside Law LLP

(57) ABSTRACT

The present invention relates to a composition comprising a) a stable aqueous dispersion of inorganic pigment particles hydrophobically modified with covalently bonded polysiloxane or silyl groups; and b) a polymeric anionic dispersant; wherein the hydrophobically modified inorganic pigment particles have an average particle size in the range of from 200 nm to 10 μm, and the solids content of the hydrophobically modified inorganic pigment particles is from 10 to 80 weight percent, based on the weight of inorganic pigment particles and water. The composition of the present invention provides a way to improve water resistance in coatings formulations.

10 Claims, No Drawings

AQUEOUS DISPERSION OF HYDROPHOBICALLY MODIFIED PIGMENT PARTICLES

BACKGROUND OF THE INVENTION

Performance of water-borne paint formulations is influenced in part by the surface chemistry of the inorganic pigment used to opacify the paint. Pigments such as the widely used $TiO_2$ tend to be hydrophilic in their native state and therefore not particularly effective as a barrier to penetration of water and water-soluble colorants at the pigment-binder interface. For this reason, it would be advantageous to modify the surface of inorganic pigment particles to provide coatings with improved resistance to stains and corrosion.

The dispersion stability of pigment particles in the paint formulation affects the hiding efficiency of the consequent film. Pigment aggregates provide less hiding than isolated primary particles; therefore, it would be further advantageous to modify the surface of pigment particles to minimize pigment aggregation in films, thereby reducing the amount of pigment needed in the formulation.

It is known in the art to modify the surface of pigment particles with hydrophobic groups. In theory, hydrophobically modified pigment particles would be expected to improve barrier properties and more strongly associate with binder particles in a latex, thereby improving hiding. Nevertheless, in practice, formulators experience great difficulty in dispersing hydrophobically modified pigment particles in water because of their poor wettability. Accordingly, it would be an advance in the art of pigmented water-borne coatings formulations to discover a hydrophobically modified pigment that are readily dispersible in water.

SUMMARY OF THE INVENTION

In a first aspect, the present invention is a composition comprising a) a stable aqueous dispersion of inorganic pigment particles hydrophobically modified with covalently bonded polysiloxane or silyl groups; and b) a polymeric anionic dispersant; wherein the hydrophobically modified inorganic pigment particles have an average particle size in the range of from 200 nm to 10 µm, and the solids content of the hydrophobically modified inorganic pigment particles is from 10 to 80 weight percent, based on the weight of inorganic pigment particles and water;

wherein the silyl groups are represented by $—Si(R^1)_3$; wherein each $R^1$ is independently $C_1$-$C_{18}$ alkyl, $C_1$-$C_{18}$ alkoxy, OH, phenyl, phenoxy, or a bond connecting the Si atom to which it is attached to the surface of an inorganic pigment particle, with the proviso that at least one $R^1$ is a $C_1$-$C_{18}$ alkyl, $C_1$-$C_{18}$ alkyoxy, phenyl, or phenoxy group; and wherein the inorganic pigment particles comprise oxides of titanium, aluminum, silicon, iron, calcium, magnesium, zirconium, or zinc.

The composition of the present invention provides a way to improve water resistance in coatings formulations.

DETAILED DESCRIPTION OF THE INVENTION

In a first aspect, the present invention is a composition comprising a) a stable aqueous dispersion of inorganic pigment particles hydrophobically modified with covalently bonded polysiloxane or silyl groups; and b) a polymeric anionic dispersant; wherein the hydrophobically modified inorganic pigment particles have an average particle size in the range of from 200 nm to 10 µm, and the solids content of the hydrophobically modified inorganic pigment particles is from 10 to 80 weight percent, based on the weight of inorganic pigment particles and water;

wherein the silyl groups are represented by $—Si(R^1)_3$; wherein each $R^1$ is independently $C_1$-$C_{18}$ alkyl, $C_1$-$C_{18}$ alkoxy, OH, phenyl, phenoxy, or a bond connecting the Si atom to which it is attached to the surface of an inorganic pigment particle, with the proviso that at least one $R^1$ is a $C_1$-$C_{18}$ alkyl, $C_1$-$C_{18}$ alkyoxy, phenyl, or phenoxy group; and wherein the inorganic pigment particles comprise oxides of titanium, aluminum, silicon, iron, calcium, magnesium, zirconium, or zinc.

As used herein, the term "stable aqueous dispersion of inorganic pigment particles" refers to a homogeneous dispersion of the inorganic pigment particles in water that maintains homogeneity for at least 24 hours without mixing. Homogeneity refers to a substantial absence of sediment and lump formation, phase separation, creaming, syneresis, and sludge.

The term "hydrophobically modified" means that the modified pigment particles have <25% by weight water uptake relative to the unmodified pigment particles at 90% relative humidity as measured using a DVS Advantage ET Analyzer (Surface Measurement Systems).

Suitable inorganic pigment particles are those particles that are functionalized at the surface with functional groups that can covalently bond with silyl or siloxyl groups. Examples of inorganic pigments include $TiO_2$, ZnO, $Al_2O_3$, $CaCO_3$, $Fe_2O_3$, $SiO_2$, and talc, with $TiO_2$ being particularly preferred. $TiO_2$ pigment particles include rutile and anatase $TiO_2$, as well as $TiO_2$ surface treated with a variety of metal oxides and hydroxides including alumina, silica, and zirconia.

Average particle size of the inorganic pigment particles is defined by the average particle size determined using a Malvern Zetasizer Nano Particle Size Analyzer. Preferably, the average particle size of the inorganic pigment particles is from 240 nm to 5 µm, more preferably to 1 µm, more preferably to 500 nm, and most preferably to 400 nm.

The hydrophobically modified pigment particles are modified with covalently bonded polysiloxane groups or silyl groups. The polysiloxane hydrophobe comprises a $—O—(Si(R^2)_2—O)_n—Si(R^2)_2—O—$ backbone, wherein n is 1 to 1350, preferably 1 to 100, and wherein each $R^2$ is independently a bond connecting the polysiloxane group to the pigment particle or a side group which is preferably OH, $C_1$-$C_{18}$ alkyl, $C_1$-$C_{18}$ alkoxy, or phenyl. If none of the $R^2$ groups are bonds connecting the siloxane group to the pigment particle, then at least one of the end-group oxygen atoms is attached to the surface of the pigment particle. The endgroup oxygen atoms may otherwise be attached to H or any other endgroup. Examples of suitable endgroups include $—(CH_2)_3NH_2$, $—CH_2=CH_2$, $—CH_2CH_2OH$, $—CH_3$, $—Si(CH_3)_3$, $—(CH_2)_3OCH_2OH$, and glycidyl ether of $—(CH_2)_3OCH_2OH$. Examples of suitable polysiloxanes are polydimethylsiloxanes. Preferred polysiloxane groups are represented by either of the following structures:

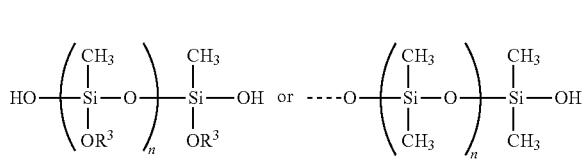

where each $R^3$ is H or a bond to the surface of the pigment particle, with the proviso that at least one $R^3$ is a bond to the surface of the pigment particle; n is from 1 to 100; and the dotted line represents a bond to the surface of the pigment particle.

Preferred silyl groups are $C_1$-$C_{18}$ alkylsilyl groups, which may be linear or branched mono-, di-, or trialkylsilyl groups; preferred $C_1$-$C_{18}$-alkylsilyl groups are $C_1$-$C_8$-alkylsilyl groups, more preferably $C_1$-$C_4$-alkylsilyl groups. Examples of suitable $C_1$-$C_8$ alkylsilyl groups include methylsilyl, dimethylsilyl, trimethylsilyl, ethylsilyl, diethylsilyl, triethylsilyl, n-propylsilyl, di-n-propylsilyl, tri-n-propylsilyl, n-butylsilyl, di-n-butylsilyl, tri-n-butylsilyl, t-butylsilyl, di-t-butylsilyl, tri-t-butylsilyl, ethyldimethylsilyl, n-propyldimethylsilyl, n-butyldimethylsilyl, t-butyldimethylsilyl, and n-octyldimethylsilyl.

Other examples of suitable silyl groups are mono-, di-, and triphenylsilyl groups, as well as alkylphenylsilyl groups such as $C_1$-$C_4$alkylphenylsilyl, di-$C_1$-$C_4$alkyl-phenylsilyl, and diphenyl-$C_1$-$C_4$alkylsilyl groups.

Silylation is conveniently carried out by contacting an alkylsilyl halide such as trimethylsilyl chloride with the pigment particles, preferably $TiO_2$, preferably, but not necessarily in the presence of a promoter/co-reactant such as hexamethyldisilazane. Hydrophobic modification of the surface of the inorganic pigment particles can also be achieved by contacting a polyalkylhydrosiloxane or a polyalkylsiloxane with pigment particles, preferably $TiO_2$. A preferred polyalkylhydrosiloxane is a polymethylhydrosiloxane.

The polymeric anionic dispersant, which is a polymer functionalized with more than one anionic group, promotes the formation of a stable aqueous dispersion of the pigment particles. As distinct from surfactants, polymeric anionic dispersants comprise a plurality of anionic groups, preferably at least 5 anionic groups per molecule. Mechanistically, dispersants interact with the inorganic pigment at the water-pigment interface; in contrast, surfactants interact with the oil-water or air-water phase. Consequently, surfactants lower the air-water or oil-water surface tension whereas dispersants do not significantly lower surface tension.

Examples of suitable dispersants include salts of a) a homopolymer or a copolymer a carboxylic acid monomer; b) a copolymer of maleic anhydride and diisobutylene; c) a copolymer of styrene and maleic anhydride; d) carboxylmethyl cellulose; and e) a homopolymer or copolymer with a plurality of sulfate, sulfonate, phosphate, or phosphonate groups, or combinations thereof, attached to the polymer or copolymer backbone.

Suitable carboxylic acid monomers include acrylic acid, methacrylic acid, or itaconic acid, or a combination thereof as well as anhydrides of carboxylic acid monomers, such as methacrylic anhydride and maleic anhydride. Acrylic acid is a preferred carboxylic acid monomer. Examples of monomers suitable to form carboxylic acid functionalized copolymers include nonionic acrylate or methacrylates such as ethyl acrylate, butyl acrylate, methyl methacrylate, butyl methacrylate, 2-ethylhexyl acrylate, and benzyl methacrylate, and combinations thereof.

Suitable counterions for the dispersants include $Li^+Na^+$, $K^+$, and $NH_4^+$ counterions, as well as alkanolamines such as 2-amino-2-methyl-1-propanol. The dispersant is preferably used at a concentration in the range of from 0.1, more preferably from 0.2, most preferably from 0.3 to 5, more preferably to 3, and most preferably to 2 weight percent based on the weight of the pigment particles.

Commercial examples of salts of polyacrylic acids and copolymers thereof include TAMOL™ 945, TAMOL 1124, TAMOL 681, TAMOL 2002 Dispersant (supplied as the polyacid and subsequently neutralized), and TAMOL 2011 Dispersants. (TAMOL is a Trademark of The Dow Chemical Company or its Affiliates). Commercial examples of salts of copolymers of maleic anhydride and diisobutylene include TAMOL 731A and TAMOL 165 Dispersants; WALOCEL™ C USP/EP and WALOCEL CRT 40000 Carboxymethyl Cellulose Sodium Salts are commercial examples of salts of carboxylmethyl cellulose. (WALOCEL is a Trademark of The Dow Chemical Company or its Affiliates). SMA 1440H Dispersant is a commercial example of a salt of a copolymer of styrene and maleic anhydride; and ACUMER™ 2100and 3100 Dispersants are commercial examples of polymers containing sulfonate groups. (ACUMER is a Trademark of The Dow Chemical Company or its Affiliates.)

The weight average molecular weight ($M_w$) of the dispersant is preferably in the range of from 2000 Daltons to 300,000 Daltons, more preferably to 200,000 Daltons as measured by size exclusion chromatography using polyacrylic acid standards ranging in molecular weight from 216 g/mol to 1,100,000 g/mol.

The solids content of the inorganic pigment particles is preferably from 20, more preferably from 40, and most preferably 60 weight percent to 80 weight percent, based on the weight of the water and the pigment particles.

The stable aqueous dispersion of hydrophobically modified inorganic pigment particles is preferably prepared with less surfactant than dispersant, and preferably comprises a substantial absence of surfactant, which is useful for reducing foaming during processing of the pigment dispersion with other components used in the manufacture of coatings formulations. As used herein "substantial absence of surfactant" means that the stable aqueous dispersion of hydrophobically modified inorganic pigment particles comprises less than 0.2, preferably less than 0.1, more preferably less that 0.05, and most preferably less than 0.01 weight percent surfactant, based on the weight of the pigment particles.

The polymeric anionic dispersant is also capable of dispersing the inorganic pigment particles without chemically binding to the hydrophobically modified pigment particles.

The composition of the present invention is suitable for coatings formulations, which includes a binder and additional water (for example, a latex), and preferably one or more additional materials including defoamers, surfactants, solvents, thickeners, extenders, coalescents, biocides, and colorants. The composition provides coating compositions with improved water-resistance over pigment particles that are not hydrophobically modified, as demonstrated by the following examples.

EXPERIMENTAL

Intermediate Example 1

Preparation of $TiO_2$ Particles Hydrophobically Modified with Chlorotrimethylsilane In a dry 100-mL Schlenk flask under argon, of Ti-Pure R-706 $TiO_2$ (R-706, 12 g) was treated first with chlorotrimethylsilane (10 mL) followed by hexamethyldisilazane (15 mL). The flask was sonicated for 1 min, immersed in an oil bath at 120° C., and stirred under reflux for 18 h. After cooling to room temperature, the solid was isolated by centrifugation (10 min at 14,000 rpm) and subsequently washed by redispersing via sonication and vortexing in 75 mL of acetone (twice), methanol (once), and water (twice).

The solid was dried on a freeze dryer and ground with a mortar and pestle, yielding a fine white powder that was resistant to wetting. Yield=11.15 g.

Intermediate Example 2

Preparation of $TiO_2$ Particles Hydrophobically Modified with Butyldimethylchlorosilane The procedure was carried out substantially as described for Intermediate Example 1 except that the Ti-Pure R-706 $TiO_2$ was scaled to 4 g, and butyldimethylchlorosilane (10 mL) and anhydrous pyridine (1 mL) were used instead of chlorotrimethylsilane and hexamethyldisilazane.

Intermediate Example 3

Preparation of $TiO_2$ Particles Hydrophobically Modified with Octyldimethylchlorosilane The procedure was carried out substantially as described for Intermediate Example 1 except that octyldimethylchlorosilane (25 mL) and anhydrous pyridine (2 mL) were used instead of chlorotrimethylsilane and hexamethyldisilazane.

Intermediate Example 4

Preparation of $TiO_2$ Particles Hydrophobically Modified with Polydimethylsiloxane In a dry 100-mL Schlenk flask equipped with a magnetic stir bar, R-706 (12 g) was combined with polydimethylsiloxane (60 mL, MW=550 g/mol) to form a suspension. The suspension was stirred and sonicated for 3 min, followed by heating at 120° C. for 18 h with stirring. The suspension was cooled to room temperature and the solid was isolated by centrifugation, then washed by redispersing via sonication and vortexing in 75 mL hexane (twice), acetone (once), and water (twice). The solid was dried under vacuum. Yield=11.80 g.

Intermediate Example 5

Preparation of $TiO_2$ Particles Hydrophobically Modified with Polymethylhydrosiloxane In a 250-mL Schlenk flask, R-706 (50 g) was combined with polymethylhydrosiloxane (25 mL, MW=1700-3200 g/mol) and toluene (175 mL) to form a suspension, which was sonicated for 2 min then stirred with a mechanical stirrer (Ika RW 20) for 18 h. The solid product was isolated by centrifugation, then washed by redispersion, sonication, and vortexing in 75 mL hexane (three times). The solid was dried in vacuo. Yield=48.90 g.

Intermediate Example 6

Preparation of $TiO_2$ Particles Hydrophobically Modified with Chlorotrimethylsilane The procedure was carried out substantially as described for Intermediate Example 1 except that Ti-Pure R-931 (R-931, 12 g) was used instead of R-706.
Qualitative Demonstration of Hydrophobicity
None of the hydrophobically modified particles wetted spontaneously when added to water. R-706 (200 mg in each case) spontaneously immersed in water (5 mL), demonstrating the wettability of this untreated hydrophilic pigment. In contrast, the hydrophobically modified materials did not penetrate the surface of the water and instead floated on the surface.

Example 1

Preparation of Stable Aqueous Dispersion of Intermediate Example 1

The dispersion stability of pigment particles was determined by examining particle sedimentation under centrifugal force. 1 mg/mL suspensions of the unmodified and hydrophobically modified pigments were prepared in both aqueous pH 8 HEPES buffer solution and unbuffered pH 8 water by vortexing and sonication for 5 min in an Elmasonic S10-H sonicator, then equilibrated by stirring for 18 h. After equilibration, the samples were sonicated for another 5 min. Dynamic light scattering verified the dispersion contained primary particles and not aggregates. 1.3 mL of the stock solution was transferred to a 1.5 mL Eppindorf tube and centrifuged at 1500 G for 90 s. 700 μL of the supernatant was carefully transferred to a cuvette, and light transmittance at 310 nm was measured using a SpectraMax M2 UV-Vis Absorption spectrometer.

Dispersion measurements were carried out on unmodified R-706 and Intermediate Example 1 in 0.25 mM pH 8 aqueous HEPES solution using TAMOL™ 1124 Dispersant, polyacrylic acid ($M_w$=15,000), and carboxymethyl cellulose sodium salt ($M_w$=90,000), at concentrations of 50, 5, and 0.5 weight percent, based on the weight of the pigment particles. With no dispersant present, R-706 and Intermediate Example 1 formed sediment readily under centrifugation, while the supernatant exhibited >90% light transmittance. This finding demonstrated that both the modified and unmodified pigments were unstable in the absence of a polyanionic dispersant. In the presence of each of the anionic dispersants tested, less sedimentation was observed, indicating that the polyanion stabilized the dispersion. These tests are believed to be the first demonstration of the stabilization of hydrophobically modified pigment particles in water using a dispersant.

Examples 2-5

Preparation of Stable Aqueous Dispersions of Intermediate Examples 2-5

The procedure of Example 1 was substantially followed except that only TAMOL™ 1124 Dispersant (TAMOL 1124) and carboxymethyl cellulose sodium salt (NaCMC, $M_w$=90,000) were evaluated at 0.5 weight percent, based on the weight of the pigment. The effects of sodium carboxymethyl cellulose (NaCMC) and TAMOL 1124 Dispersant (TAMOL 1124) on the stability of the aqueous dispersions of unmodified R-706 and the hydrophobically modified R-706 of Intermediate Examples 1-5 are shown in Table 1.

TABLE 1

Dispersion Stability of Unmodified and
Hydrophobically Modified R-706 with Dispersant

| | Dispersant (% Transmittance [a]) | |
|---|---|---|
| Pigment | NaCMC | TAMOL 1124 |
| R-706 | 43 | 29 |
| Int. Ex. 1 | 13 | 13 |
| Int. Ex. 2 | 14 | 13 |
| Int. Ex. 3 | 27 | 17 |
| Int. Ex. 4 | 55 | 13 |
| Int. Ex. 5 | 19 | 18 |

[a] light transmittance at 310 nm of a 1 mg/mL suspension in 0.25 mM pH 8 HEPES buffer after centrifugation for 90 s at 1500 G.

The data show that all aqueous dispersions of hydrophobically modified pigment particles showed greater stability than the unmodified pigment particles in all but one instance. The low % Transmittance of the supernatants of the aqueous dispersions prepared from Intermediate Examples 1 and 2 demonstrate the advantages of short-chain alkyl groups; additionally, the acrylic acid based dispersant provided consistently better stability, especially for the pigment particles modified with polydimethyldisiloxane (Int. Ex. 4).

Example 6

Preparation of a Stable Aqueous Dispersion of Intermediate Example 6

The procedure of Examples 2-4 was substantially followed and the results are shown in Table 2. R-931 refers to the unmodified Ti-Pure R-931 $TiO_2$.

TABLE 2

Dispersion Stability of Unmodified and
Hydrophobically Modified R-931 with Dispersant

| | Dispersant (% Transmittance [a]) | |
|---|---|---|
| Pigment | NaCMC | TAMOL 1124 |
| R-931 | 73 | 68 |
| Int. Ex. 5 | 52 | 46 |

Viscosity of High Concentration Aqueous Dispersions of Hydrophobically Modified Inorganic Pigment Particles High concentration inorganic pigment particle dispersions were prepared by combining R-706 or Intermediate 1 (3 g) with water (3 mL) and TAMOL™ 1124 Dispersant (30 uL, 50% aqueous) in an 8-mL plastic vial equipped with a Teflon coated magnetic stir bar. The contents of the vial were vortexed extensively and adjusted to pH 9 with 4 M aqueous sodium hydroxide. The dispersion was transferred to a 50-mL zirconia crucible containing five 1-cm zirconia grinding stones and milled on a Fritsch Pulverisette 7 classic at 250 rpm for 20 min. The final pH of the dispersions was 8.8. The viscosities of the dispersions were measured on a cone and plate viscometer with a 40-mm cone with a 2° angle. The gap size was set to 50 μm, and viscosities (η in Pa·S) were evaluated versus shear rates ($s^{-1}$) for R-706, with and without TAMOL 1124 Dispersant, as well as R-706 hydrophobically modified with chlorotrimethylsilane, with and without TAMOL™ 1124 Dispersant. The viscosities at a shear rate of 182 $s^{-1}$, which approximates the shear rate at which dispersions are mixed and poured, are shown in Table 3.

TABLE 3

Viscosity/Shear Rate Profile of Dispersions

| | η (Pa · S)<br>Shear Rate 182 $s^{-1}$ |
|---|---|
| R-706 | $1.4 \times 10^{-2}$ |
| R-706 + TAMOL 1124 | $5.5 \times 10^{-3}$ |
| Int. Ex. 1 | $2.0 \times 10^{-1}$ |
| Int. Ex. 1 + TAMOL 1124 | $6.9 \times 10^{-3}$ |

The data show that stable aqueous dispersions of hydrophobically modified pigment particles can be obtained at high concentrations using polyanionic dispersants.

Measurement of Stain Resistance of a Paint

Paints were formulated in accordance with Table 4. The formulation has a pigment volume concentration (PVC) of 13.7%. The latex refers to a 50/49/1 by weight butyl acrylate/styrene/methacrylic acid latex having 36% solids and an average particle size of 122 nm as measured by a Malvern Nano-ZS Zetasizer. Pigment refers to either R-706 or Intermediate 1, and TRITON X-100 refers to TRITON™ X-100 Surfactant (A Trademark of The Dow Chemical Company or its Affiliates).

TABLE 4

Paint Formulation with Modified and Unmodified Pigments

| Component | Mass (g) | Vol. (mL) | Wt. % | Vol. % |
|---|---|---|---|---|
| R-706 | 0.380 | 0.089 | 15.2 | 13.7 |
| Int. Ex. 1 | 0.380 | 0.089 | 15.2 | 13.7 |
| Latex | 0.599 | 0.565 | 23.9 | 86.3 |
| TAMOL 1124 | 0.010 | 0.010 | 0.4 | |
| TRITON X-100 | 0.053 | 0.050 | 2.1 | |
| Water | 1.461 | 1.461 | 58.4 | |
| Total | 2.503 | 2.150 | 100 | 100 |

Table 5 illustrates stain and tear resistance for coatings from paint formulations with modified and unmodified pigment. Paints were applied to a substrate and allowed to dry. Stains were created by adding a few drops of coffee on the coating and wiping of residual coffee with a tissue after standing for 15 min. A 1-10 scale is used with 1 indicating no staining and 10 indicating complete staining or browning.

TABLE 5

Coffee Stain Resistance Comparison of Paints

| Paint # | Pigment | Stain Value | Tearing? |
|---|---|---|---|
| 1 | R-706 | 3 | Y |
| 2 | Int. Ex. 1 | 1 | N |

The results show that paints with unmodified pigment were more susceptible to tearing and less resistant to staining than the paint with the hydrophobically modified pigment.

The invention claimed is:

1. A composition comprising a) a stable aqueous dispersion of inorganic pigment particles hydrophobically modified with covalently bonded polysiloxane or silyl groups; and b) a polymeric anionic dispersant; wherein the hydrophobically modified inorganic pigment particles have an average particle size in the range of from 200 nm to 10 μm, the solids content of the hydrophobically modified inorganic pigment particles is from 20 to 80 weight percent, based on the weight of inorganic pigment particles and water, and the concentration of the dispersant is in the range of 0.1 to 2 weight percent based on the weight of the pigment particles;

wherein the silyl groups are represented by —Si($R^1$)$_3$; wherein each $R^1$ is independently $C_1$-$C_{18}$ alkyl, $C_1$-$C_{18}$ alkoxy, OH, phenyl, phenoxy, or a bond connecting the Si atom to which it is attached to the surface of an inorganic pigment particle, with the proviso that at least one $R^1$ is a $C_1$-$C_{18}$ alkyl, $C_1$-$C_{18}$ alkyoxy, phenyl, or phenoxy group; and wherein the inorganic pigment particles comprise oxides of titanium, aluminum, silicon, iron, calcium, magnesium, zirconium, or zinc.

2. The composition of claim 1 wherein the inorganic pigment particles are hydrophobically modified with —Si($R^1$)$_3$ groups, wherein the inorganic pigment particles are $TiO_2$, ZnO, $Al_2O_3$, $CaCO_3$, $Fe_2O_3$, $SiO_2$, or talc.

3. The composition of claim 2 wherein each $R^1$ is independently a $C_1$-$C_8$-alkyl group.

4. The composition of claim 3 wherein the polymeric anionic dispersant is a salt of a) a homopolymer or copolymer of a carboxylic acid monomer; b) a copolymer of maleic anhydride and diisobutylene; c) a copolymer of styrene and maleic anhydride; d) carboxylmethyl cellulose; or e) a homopolymer or copolymer with a plurality of sulfate, sulfonate, phosphate, or phosphonate groups, or combinations thereof, attached to the polymer or copolymer backbone; and wherein the $M_w$ of the dispersant is in the range of 2000 to 300,000 Daltons.

5. The composition of claim 4 wherein the pigment particles are $TiO_2$ particles having an average particle size in the range of from 200 nm to 400 nm, and wherein each $R^1$ is independently $C_1$-$C_4$-alkyl.

6. The composition of claim 5 wherein the polymeric anionic dispersant is a salt of:
a) a homopolymer of acrylic acid; or
b) a copolymer of acrylic acid and one or more nonionic acrylates or methacrylates selected from the group consisting of ethyl acrylate, butyl acrylate, methyl methacrylate, butyl methacrylate, 2-ethylhexyl acrylate, and benzyl methacrylate; or
c) carboxylmethyl cellulose; and wherein
each $R^1$ is methyl;
wherein the solids content of the inorganic pigment particles is from 60 to 80 weight percent, based on the weight of the water and the pigment particles.

7. The composition of claim 6 which comprises a substantial absence of a surfactant.

8. The composition of claim 1 wherein the inorganic pigment particles are hydrophobically modified with siloxane groups represented by either of the following structures:

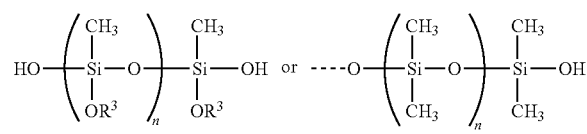

where each $R^3$ is H or a bond to the surface of the pigment particle, with the proviso that at least one $R^3$ is a bond to the surface of the pigment particle; n is from 1 to 100; and the dotted line represents a bond to the surface of the pigment particle.

9. The composition of claim 1 which further includes a binder, additional water, and one or more components selected from the group consisting of defoamers, surfactants, solvents, thickeners, extenders, coalescents, biocides, and colorants.

10. The composition of claim 5, wherein the polymeric anionic dispersant is a salt of:
a) a copolymer of maleic anhydride and diisobutylene;
b) a copolymer of styrene and maleic anhydride; or
c) a homopolymer or copolymer with a plurality of sulfate, sulfonate, phosphate, or phosphonate groups.

\* \* \* \* \*